United States Patent
Hogg

[15] 3,668,531
[45] June 6, 1972

[54] PULSE ANALYZING APPARATUS

[72] Inventor: Walter R. Hogg, Hialeah, Fla.

[73] Assignee: Coulter Electronics, Inc., Hialeah, Fla.

[22] Filed: June 15, 1970

[21] Appl. No.: 48,888

Related U.S. Application Data

[63] Continuation of Ser. No. 614,496, Feb. 7, 1967, abandoned, which is a continuation-in-part of Ser. No. 529,452, Feb. 23, 1966, abandoned.

[52] U.S. Cl. ............................ 328/150, 328/115, 328/127, 328/111
[51] Int. Cl. ........................................................ H03k 17/00
[58] Field of Search ................ 328/111, 112, 114, 116, 151, 328/150, 115, 127; 307/266, 218, 234, 235

[56] References Cited

UNITED STATES PATENTS

| | | | |
|---|---|---|---|
| 2,732,753 | 1/1956 | O'Konski | 250/218 |
| 2,837,639 | 6/1958 | Gray et al. | 328/116 |
| 2,927,207 | 3/1960 | Fiehrer et al. | 328/116 |
| 2,996,624 | 8/1961 | Mumma | 328/116 |

*Primary Examiner*—Donald D. Forrer
*Assistant Examiner*—Harold A. Dixon
*Attorney*—Silverman & Cass

[57] ABSTRACT

Apparatus finding the amplitude of a pulse at its center by comparing the pulse with its integral, adjusted to pass through the amplitude of the pulse at its time center, and passing to coincident gating means a signal having the pulse center amplitude at that time and a signal of fixed duration initiated at the finding of the pulse center. Also, a particle analyzing a system intercoupling the amplitude finding apparatus between a pulse generating transducer of liquid suspended particles and pulse classification structure.

22 Claims, 6 Drawing Figures

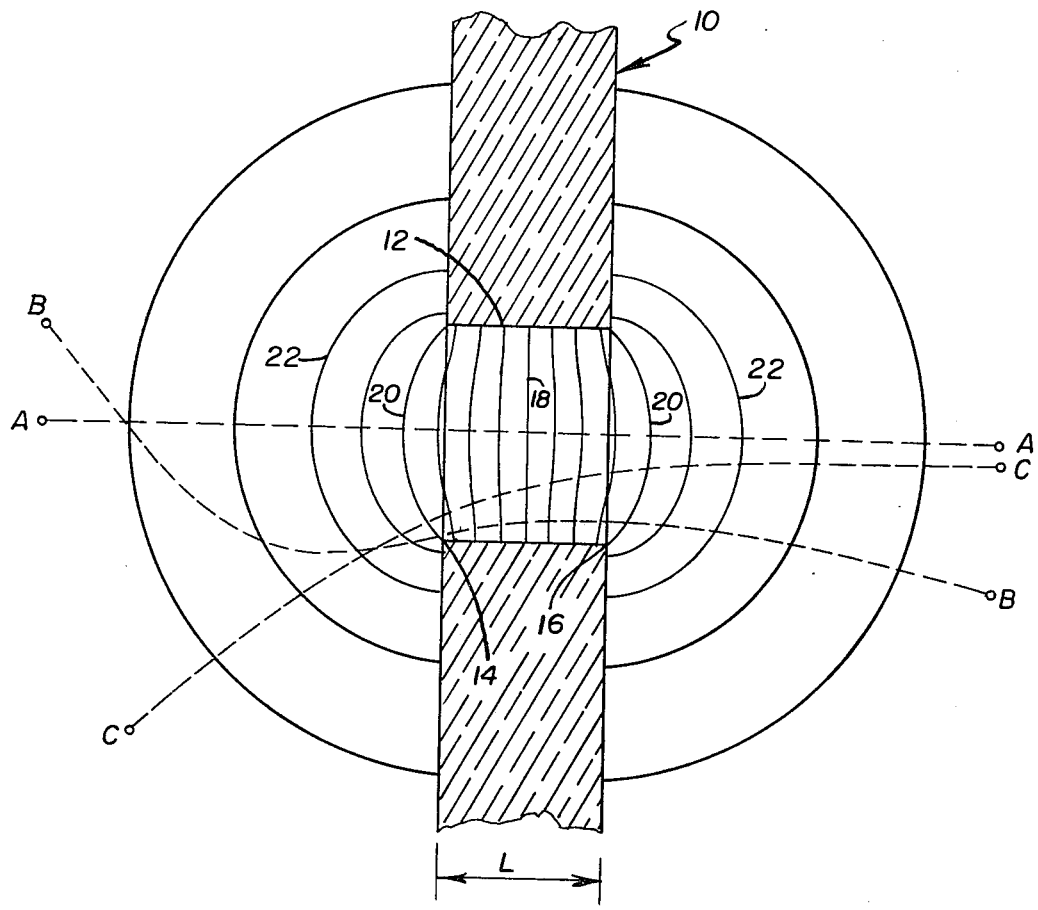
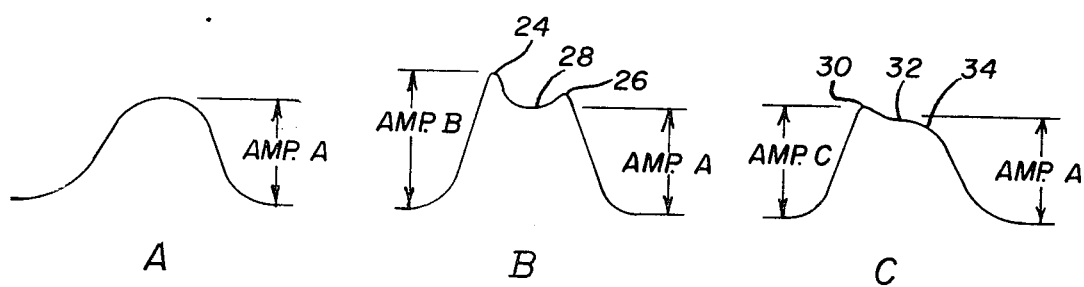
FIG. 1
INVENTOR
WALTER R. HOGG
BY
Silverman & Cass
ATTORNEYS

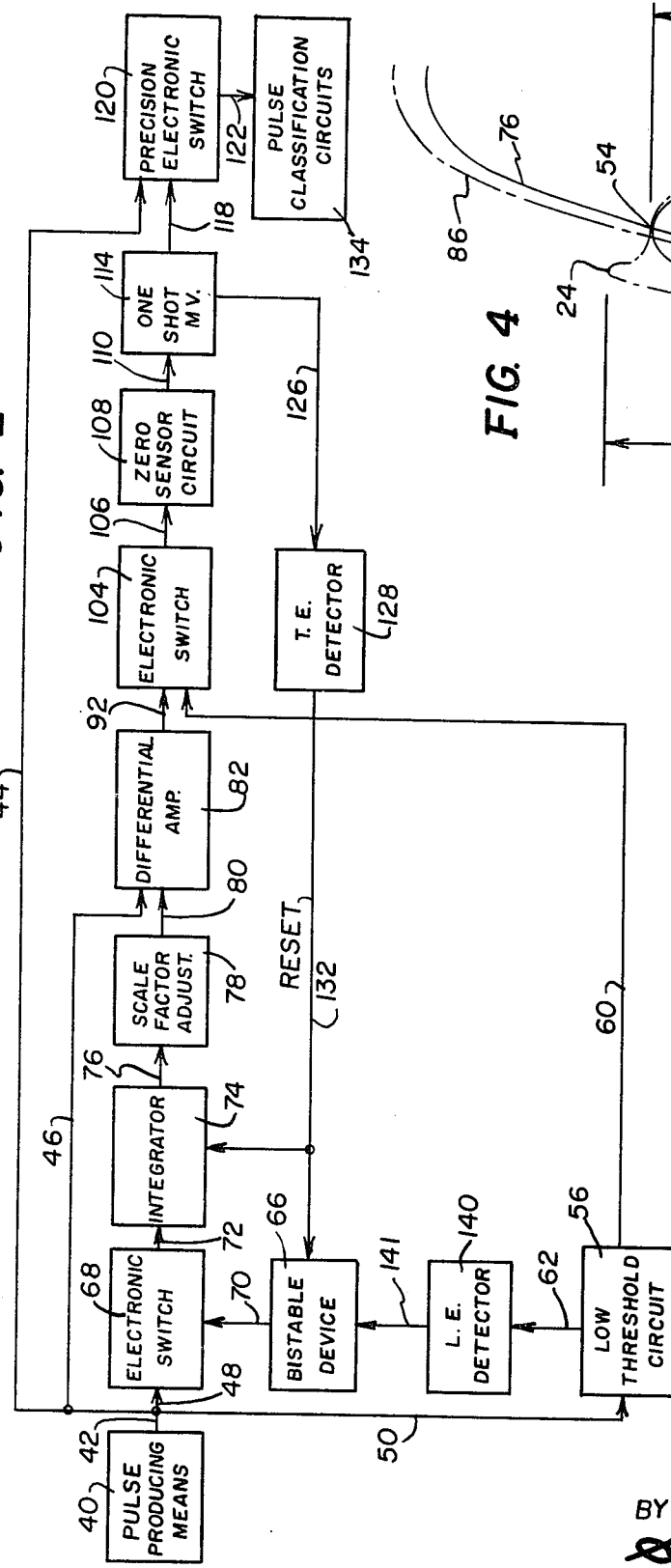
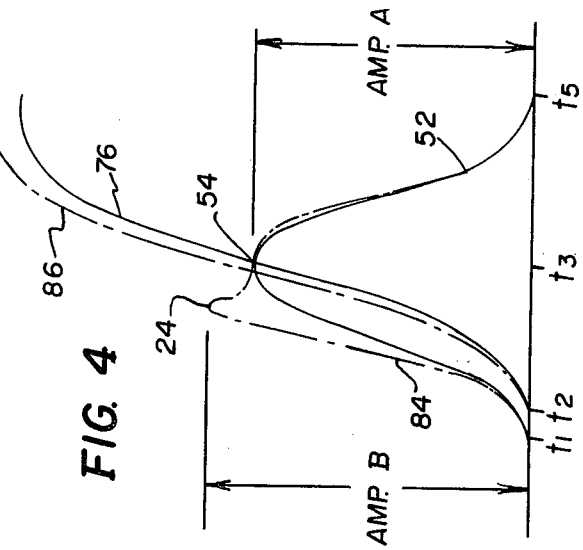

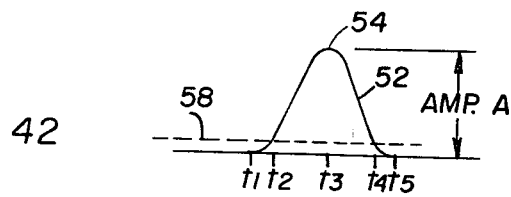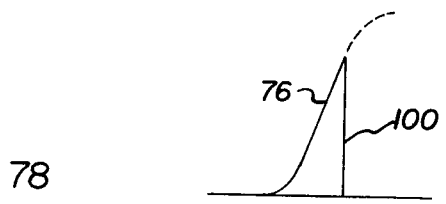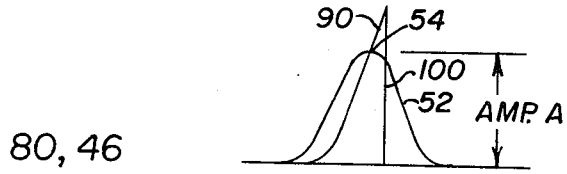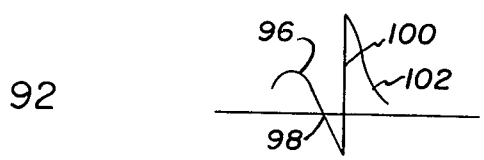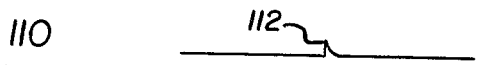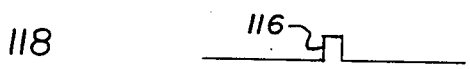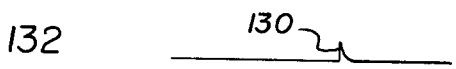
FIG. 3

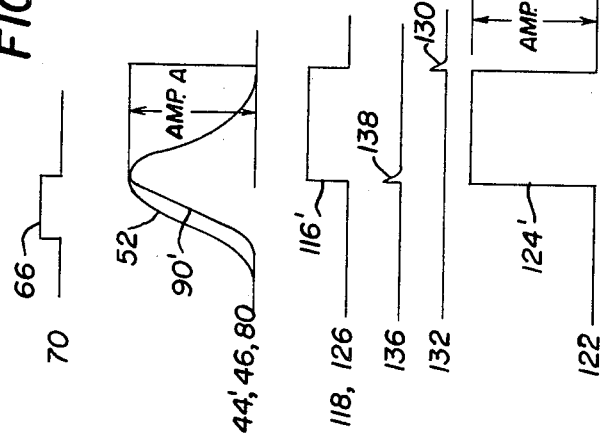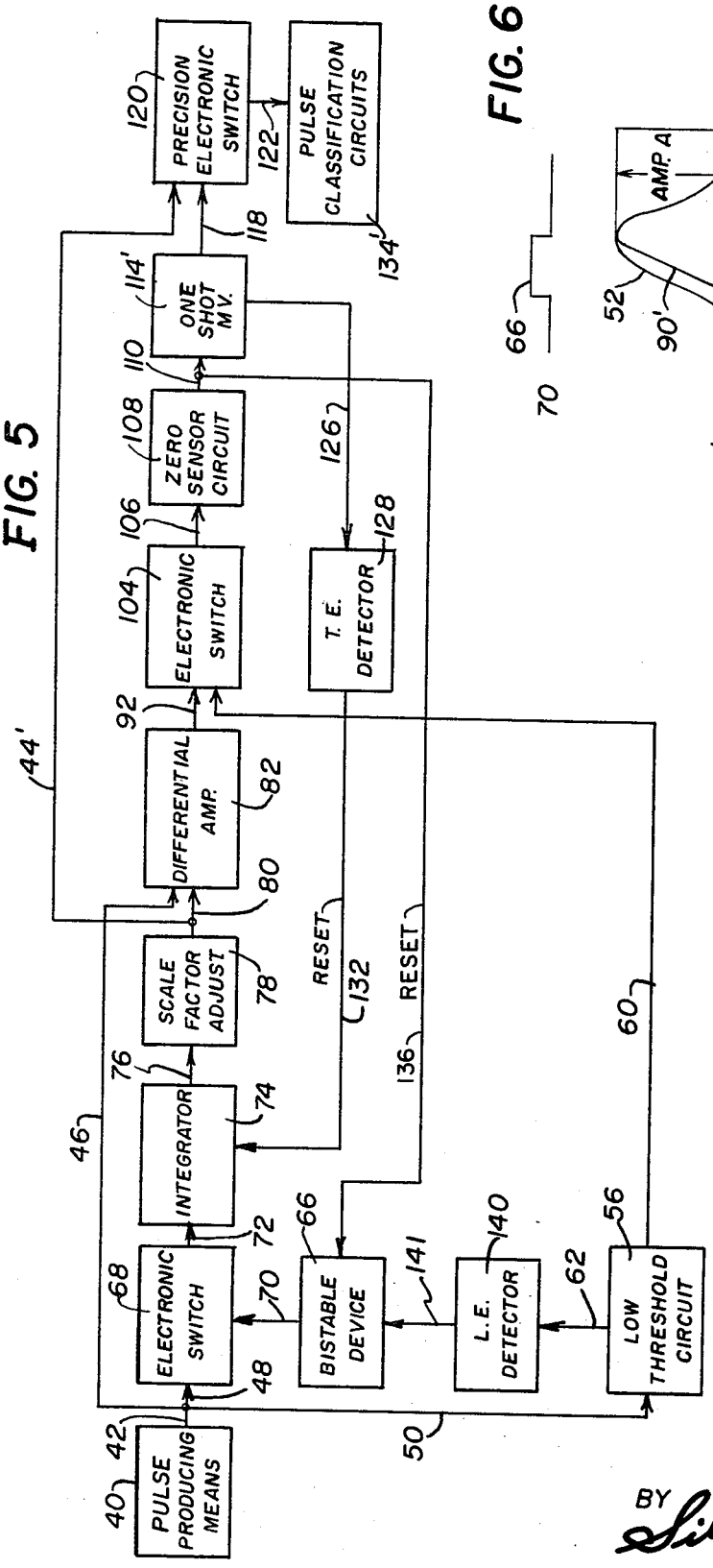

PULSE ANALYZING APPARATUS

This application is a continuation of my now abandoned application, Ser. No. 614,496, filed Feb. 7, 1967, entitled "Improved Pulse Analyzing Apparatus," which was a continuation-in-part of my now abandoned application, Ser. No. 529,452 filed Feb. 23, 1966, entitled "Aperture Linearity Improvement Apparatus for Coulter Counting and Sizing Device."

This invention relates to a pulse analyzing apparatus which is responsive only to the amplitude found at the center of a pulse and, more particularly, to particle analyzing apparatus which provides a more accurate response to the passage of particles through the transducer portion of an electronic particle analyzing device.

The specific end sought by this invention is to improve upon the linearity of the detected response from the transducer portion of an electronic particle analyzing device by increasing the validity of the proportional relationship between the size of a particle and the amplitude of the signal pulse derived from the transducer portion in response to the detection of a particle.

To accomplish the specific end, there is performed an interrogation of the portion of the pulse or a related signal which represents the detecting region of the transducer having the most uniform electric field, the remainder of the pulse being disregarded. Practically speaking, as will be detailed subsequently, the central region of the transducer, and therefore the amplitude at the center of the pulse, provides the necessary linearity. Accordingly, amplitude analysis of only the center of the pulse is accomplished by the apparatus according to this invention, which in combination with the particular particle analyzing apparatus provides a greatly improved system.

The advent of the particle counting and sizing device now known as and bearing the trademark the "Coulter Counter" made such an impact upon the field of counting and sizing particles that certain small discrepancies in its response were not important. The advance over prior crude and inaccurate methods was substantial, so that these inaccuracies were inconsequential for most purposes. In recent years, however, the requirements for more accurate particle data demanded by a burgeoning technology have resulted in more minute and sophisticated analysis and examination of the basic apparatus to ascertain the reasons for certain inaccuracies and to determine what, if anything, could be done to decrease or obviate the same.

The apparatus which is referred to is disclosed in U.S. Pat. No. 2,656,508 and operates on a principle discovered by Wallace H. Coulter, said principle now being known as the Coulter principle. In accordance with this principle, a sample quantity of a fluid suspension of the particles to be studied is caused to pass through a constricted path and the presence or absence of a particle in the constriction gives rise to a detectable change in the electric characteristics of the path. That path is so constructed so as to provide a region in which the electric field is uniform or homogeneous and, at least in the case that the suspending fluid is a conductive liquid, the said change is very nearly proportional to the volume of the particle which caused it.

In the usual commercial embodiment of the Coulter principle, the constricted field is achieved by a fine aperture in a wafer of insulating material which separates the sample suspension into two portions, each of which is connected to an electronic detector by means of a sensing electrode. These electrodes also supply the electrical excitation. The effective aperture bore will usually include quantities of the fluid which are in the regions slightly bulging out of the ends of the aperture convexly where the current density is relatively high, as will be seen hereinafter.

The interaction between the excitation and the passage of particles gives rise to electric signals which, when counted, give an accurate indication of the number of particles and, through the use of some form of amplitude discriminating means, the particles are classified according to their size by classifying the different amplitudes of pulses.

In order to obtain an electric signal, according to the patent above mentioned, and as provided in the commercial versions of the "Coulter Counter," a stable electric current is established in the aperture. This is done by providing the aperture in a wall of an insulating material between two bodies of liquid, at least the upstream body having the sample suspension therein, immersing electrodes in each body of fluid, and connecting a suitable current source to the electrodes. The fluid is caused to flow from one fluid body through the aperture to the other body and, as it flows, the particles are carried through the aperture at a rapid rate. The impedance changes which are produced by the passage of each particle are detected by some form of electronic detector connected to the electrodes. In commercial versions of the "Coulter Counter" the electric signals produced are counted, displayed on a cathode ray oscilloscope, classified by various fixed and/or variable threshold circuits, recorded, and so on.

The Coulter principle has been proven valid by the studies of many workers in the particle field, and indeed, a perfect apparatus will produce electric responses which are truly accurate representations of the respective particles producing them. Of course, the perfect apparatus is not to be expected and the extent from which the departure from perfection is consequential to a given study depends upon the field of study. Generally, in the use of the apparatus for primarily counting and secondarily sizing, as in most routine medical and biological work, the linearity of response of signals to particle sizes is not as important as in specific medical and biological research and in industrial studies. In the latter field, the dynamic range of particle size is quite great and often the entire spectrum of sizes must be studied.

This invention results from a study made to ascertain why there was a discrepancy in certain particle sizing investigations carried on in which the sizes of the particles as measured in accordance with the Coulter principle seemed greater than they should have been. The discovery was made in considering particulate systems which were known to have a very narrow dynamic range of particle sizes. The plotting of size versus number, in a typical differential curve, indicated that the particles were larger than they should have been. The investigation to ascertain the reason for the seeming inaccuracy consisted of two aspects. In one, a great number of photographs were taken of individual pulses appearing on a cathode ray oscilloscope, such pulses resulting from the detection of the passage of individual particles through a typical aperture; and in the other, a study was made of the geometry of a typical particle path with respect to the isopotential surfaces existing in and in the immediate vicinity of an aperture. The isopotential surfaces are related to current characteristics.

As a result of these studies, it was found that the center of a pulse is its more accurate part, since there could be false peaks at the beginning and end of pulses, caused by certain phenomena described hereinafter. For most purposes, the center of the signal pulse represents the detecting region having the most uniform field; accordingly, the apparatus may be referred to as a "uniform field" or "center finding" device, since it automatically and continuously finds the center of each pulse as its arrives from the pulse producing means and produces a second artificial signal of a fixed duration; the artificial signal having an amplitude equal to the amplitude of the pulse at its center for further processing in the apparatus.

Accordingly, an important object of the invention is to provide apparatus which provides size information based upon a measurement of the amplitude of only the center of each pulse.

The details and electronic circuitry of the apparatus are capable of wide variations; so that, in the drawings which accompany the description and in the description itself, reference will be made to components and circuits only generally and by blocks, since the electronic worker will know and understand not only the form of circuitry which may be used, but many alternates and equivalents which will perform as described.

In the accompanying drawings:

FIG. 1 is a diagrammatic view illustrating the profile of an aperture having three particles passing through the same along different paths A, B and C. The resulting electric pulses produced by the respective particles are shown in the view below the aperture profile;

FIG. 2 is a block diagram of a "center finder" apparatus constructed according to the invention;

FIG. 3 is a series of wave shapes, illustrating signals, on the same time axis, occurring in various parts of FIG. 2;

FIG. 4 is an enlarged view showing several superimposed wave shapes of pulses produced by particles and their integrals;

FIG. 5 is a block diagram similar to FIG. 2 and illustrating another form of the invention; and FIG. 6 is an enlarged view of wave shapes, some of which are shown in FIG. 3, but modified by the apparatus of FIG. 5.

The invention is characterized by the provision of means to find the center of a pulse produced by the passage of a particle through an aperture, and the provision of means for producing an artificial signal whose amplitude is equal to the center amplitude of the pulse and of a constant duration. Thereafter these artificial signals are sized and counted and give more accurate data than the use of the raw pulses obtained from the detector of the particle analyzing apparatus.

The studies mentioned above indicated that the pulses which are produced by a typical particle analyzing apparatus are not all similar in configuration, even if the particles causing same are identical in size. A relatively large percentage, of the order of 15 percent have little peaks, usually at their leading edges and occasionally at their trailing edges. In FIG. 1, there is illustrated at the top of the view the sectional profile of a typical wafer 10 in a "Coulter Counter" counting and sizing apparatus having an aperture 12 bored therein. The structure is shown idealized, that is, with perfectly cylindrical bore and precisely sharp edges 14 and 16. When the aperture current is established in the apparatus, it flows through the aperture from one side to the other, as for example, from the left side to the right. The entire volume illustrated is filled with the sample fluid or electrolyte, but no symbols are used to illustrate this in order to keep the view simple. As the electric current passes through the liquid, the electric current density at the aperture is different than it its throughout other parts of the bodies of fluid through which the current passes. In the aperture itself, the electric current density will vary from location to location. Importantly, the current density at the corners 14 and 16 will be very much greater than anywhere else.

In order best to illustrate this, isopotential lines are illustrated in FIG. 1. These lines are shown to be perpendicular at every point where they touch the outer surface of the wafer 10, being transverse of the bore 12 at 18, slightly bulging out at the ends 20, and being arcuate at the outer surface of the bulge 22. The wafer is usually of sapphire and always of insulating material. It will be appreciated that electric current density at any location is proportional to the number of equipotential surfaces in any given volume at that location. Although the current density in the aperture 12 generally is greater than it is outside of the aperture, the current density is a maximum at the corners 14 and 16, where the electric current turns the corner, so to speak, to enter the aperture 12 and therefore, is greater than in the center of the aperture.

Consider now, three particle paths A, B and C through the aperture from left to right along the broken lines shown in FIG. 1. The first particle A traverses approximately the center of the aperture with the physical stream of liquid and, as it passes from left to right through the influence of the increased current density, its maximum effect upon the resistance of the ambit of the aperture is near the center of the aperture where the isopotential lines 18 are closest and parallel to each other. Considering the graph of the resulting electrical pulse, which may be assumed to have been made by some detecting means, the pulse is shown at A. Its maximum amplitude is in the center and is designated Amp. A. The duration of the pulse is equal to the time which the particle was within the ambit of the aperture, that is, within its electrical influence. This is considerably more than L, the length of the aperture 12, since, as noted, there is a convex bulge of relatively high electric current density (evidenced by the isopotential lines 20 and 22) outside of the geometric confines of the aperture.

If there is any classification circuitry following the detector which responds to the amplitude of the pulse produced by the particle which followed the path A, it responds to the Amp. A. Further, this amplitude is proportional to the size of the particle which produced it.

If all particles follow paths similar to the path A, or quite close to the center of the aperture 12, then all of the resulting pulses would have the appearance of the pulse A, differing only in amplitude. It will be appreciated that the dimensions are exaggerated in the view to provide a better understanding of the theory of the discussion. The total duration of the pulse is commonly of the order of 20 to 40 microseconds and the circuitry needed to shape and classify such fast pulses will normally have appropriate frequency responses.

All particles do not pass through the aperture 12 along paths similar to path A. Some approach along paths considerably displaced from the axis of the physical stream of liquid and are drawn into the aperture just before the stream enters the entrance to the aperture 12, as the path C, or even closer to the entrance, as the path B. For purposes of this discussion and the wave forms illustrated, the particles which traverse these paths are to be assumed to be identical in size to the particle which traversed the path A.

First consider the particle moving along the path B. As the particle passes into the ambit of the aperture 12, it starts to produce the pulse leading edge in a manner only slightly different than the pulse at A, but when it passes close to the corner 14, where the current density is a maximum, the effect is as though the resistivity of the aperture 12 was increased quite substantially at that point. Accordingly, there will be a peak 24 of amplitude Amp. B at the beginning of the pulse. As the particle enters the aperture 12, it moves into the influence of the electric current areas where the density is quite uniform, transverse of the axis of the aperture. This is near the exact center of the aperture along its length. The isopotential lines 18 here are shown to be parallel and, if this is considered a sectional view, the isopotential lines should be considered isopotential planes. The studies were made with profiles, but are valid with three dimensional forms.

As the particle along the path B leaves the aperture 12, it passes close to the corner 16 through a region of high current density and, therefore, another peak is generated at 26, which might not be as large as the peak 24, but which would be larger than the center of the pulse indicated at 28. More likely, the particle would approach the axis of the stream so that the pulse's trailing edge would be quite similar to the trailing edge of pulse caused at A. The pulse shown at B is somewhat of an extreme occurrence in order to demonstrate the efficacy of the theory of operation of the invention. The amplitude of the center 28 of the pulse is shown to be Amp. A, since the particle generates this portion of the signal while in the region 18.

The third particle is shown traversing the path C and this produces the pulse shown at C in the bottom of the view, having one peak 30 at its leading edge which, while not as high as the peak 24, nevertheless is of amplitude Amp. C greater than the amplitude Amp. A. Its center 32 again has the amplitude Amp. A for the same reasons as explained in connection with the graph B. A trailing edge peak 34 is also shown having an amplitude similar to, yet for illustration, less than Amp. A.

According to the discussion above, the configuration of a pulse produced by a particle passing through a given aperture is dependent primarily upon the size of the particle, but secondarily upon the portion of the ambit of the aperture through which the particle passes. If all particles passed through the center region, there would be no problems, but as seen, a significant percentage does not pass through the center, and many of these have false peaks that cause improper classification of the particles producing the pulses. It was also noted that the centers of all pulses produced by particles of the same size were of substantially the same amplitude.

Several ways of avoiding the production of pulses with false peaks at their leading and/or trailing edges might seem feasible, but these are not practical. One method might be to round the contours of the aperture so that the current density in the effective ambit of the aperture is practically uniform throughout. Such apertures are not easy to manufacture and would readily block with debris that is not easily removed because of a wedging action. Another method might be to use a long aperture and pass the resulting pulse through a low pass filter, to erase the sharp peaks, but the long aperture is expensive and difficult to make, resultant simultaneous occupation of the aperture by more than one particle is more frequent, blockages are more difficult to clear, speed of operation is decreased for a given pressure differential, and the increased time spent by the constricted electrolyte in the aperture results in increased electrolyte temperature rise, creating heating noise and degrading the signal-to-noise ratio. Another way might be to physically attempt to channel the suspension into the center of the aperture, but this is an impractical approach, since other problems present themselves.

The invention herein, as previously stated, is characterized by providing circuitry which responds only to the center of the pulses, irrespective of the existence of peaks on the leading and/or trailing edges. FIG. 2 illustrates, in block diagram form, apparatus which provides, as its output, signals which respond to the center of the pulses from particles passing through an aperture. FIG. 3 is a chart of signals in the various parts of the circuit of FIG. 2, all on the same time axis.

In the apparatus of FIG. 2, the first block 40 is designated pulse producing means. This block primarily comprises the transducer of a particle counting and sizing apparatus in accordance with the Coulter principle. There is included an aperture tube having a minute aperture in its side wall, the tube being filled with liquid and immersed in a sample suspension so that the aperture is below the surface. Electrodes in the aperture tube and the container for the sample suspension enable the aperture electric current to be provided for the aperture and provide the input to the amplifier of the device. Means are included to drive the fluid through the aperture so that the typical signals or pulses caused by passage of particles will be generated. The signal which is produced at the output 42 of the transducer is applied to several parts of the apparatus by means of the lines 44, 46, 48 and 50. In FIG. 3, this signal is identified in the graph labeled 42 and comprises a pulse 52. The pulse is shown as a typical response to a particle passing through the aperture, without the false leading or trailing peaks. However, these false peaks may be assumed if desired, since as noted, the only critical part of the pulse is the peak 54 which occurs at the center of the pulse. The times of the various parts of the pulse are designated $t1$, $t2$, $t3$, $t4$, and $t5$ for the explanation; the center of the pulse occurs at the time $t3$.

The pulse 52 is applied by way of the line 50 to a low threshold circuit 56. This circuit has a threshold level which is arranged slightly above the base line of the circuit so that random noise will not produce any output signals. For convenience, this level is identified as 58 in graph 42 to establish the location of the times $t2$ and $t4$. Any signal which does not have an amplitude greater than the level 58 will not pass through the threshold circuit.

The threshold circuit 56 has its output coupled to the lines 60 and 62. This output is in the form of a low amplitude rectangular wave 64 of duration $t2$ to $t4$, these being the respective times between which the pulse 52 crosses the threshold level 58. A bistable device 66 responds to the leading edge of the signal 64, which is passed via a leading edge detector 140 and a path 141, and operates an electronic switch 68 through a connection 70, thereby permitting that portion of the pulse 52 which exceeded the threshold level 58 to pass by way of a line 72 to an integrator 74. The integrator 74 commences to generate a voltage wave shape which has the appearance of an ogive, as shown at 76 in graph 78 of FIG. 3. The curved wave starts at $t2$ and continues past $t3$. If permitted to integrate throughout the entire duration of the pulse 52, the signal from the integrator 74 would somewhat follow the broken line shown at the end of the curve, but as seen, the integrator is reset before the pulse 52 has completed its development. The integrator output appears at line 76 in FIG. 2 and is applied to a scale factor adjusting circuit 78, from which the resulting wave is applied via a line 80 to the input of a differential amplifier 82.

In the same period of time, the pulse 52 is applied by way of the line 46 to the differential amplifier 82. The purpose of the scale factor adjusting circuit 78 is to enable the integrator 74 to be used as a time scale device. The scale factor of the circuit 78 is chosen so that the integrator has a voltage output equal to that of a particle pulse at the instant that the particle is in the center of the aperture 12. The differential amplifier receives both signals and produces a minimum or zero amplitude signal where the integral signal, appearing on line 80, and the pulse signal 52 appearing on line 46, have the same amplitudes, which is at the points where the two signals cross, as shown on graph 80, 46. This will be explained in connection with FIG. 4 which shows the integral and normal signals produced from the same pulse passing through the aperture along the paths A and B discussed previously with reference to FIG. 1.

In FIG. 4, there are illustrated four curves superimposed. These are the waves A and B of FIG. 1 on a greatly enlarged scale, the trailing peak 26 being omitted for purposes of simplicity, and their respective integrals. For purposes of the discussion, the normal pulse will be related to FIG. 3. The normal pulse, produced by a particle which passes through the center of the aperture 12 along the path A in FIG. 1, is the solid line wave 52 having a peak at 54 which is of amplitude Amp. A. This peak occurs at time $t3$. When integrated and adjusted so that the integral voltage, which is of amplitude Amp. A, occurs at $t3$ and hence at the peak 54, the resulting wave will be the solid ogive shaped curve 76. The pulse caused by a particle passing through the aperture along the path B is shown in broken lines and is designated 84, having a peak 24 at amplitude Amp. B substantially greater than the amplitude Amp. A. When integrated and adjusted as described above, its integral curve in broken line ogive configuration is designated 86. It is important to note that although the integral curve 86 intersects the pulse 84 somewhat sooner than the integral curve 76 intersects the pulse 52, the small timing error occurs while the particle is roughly centered in the aperture, and hence the instantaneous signal voltage is not changing. It will be noted that the signal pulses 52 and 84 start at the time $t1$; their respective integrals start at time $t2$; the integral curves are produced using the identical scale factor adjustment; the particles producing the particle pulses are presumed to be of identical size; and the time scale is the same in all cases. The difference in height between integrals 86 and 76 is due to the difference in area between pulses 84 and 52. Although the peak 24 is considerably higher than the peak 54, the added area does not shift the integral 86 enough to the left to invalidate the measurement. No vertical scale is shown in the drawings because all pulses will have generally the same proportions, regardless of their size.

The measurement to be made is thus proven to be accurate when made at the center of the pulses, irrespective of the configurations of the pulses.

Continuing with the block diagram circuit of FIG. 2 and the related wave shapes illustrated in FIG. 3, the fourth wave shape down, at graph 80, 46, consists of the two superimposed inputs to the differential amplifier 82. The integral curve has now been adjusted by some factor so that its amplitude is equal the amplitude Amp. A at time $t3$. Although the integral curve 90 starts at time $t2$ and the particle pulse 52 starts at time $t1$, the only loss is the area under curve 52 between $t1$ and $t2$, and the closeness of the threshold 58 to the baseline makes this difference unimportant. The level of the low threshold at 58 is quite small, that illustrated being exaggeratedly large to enable it to be seen.

The differential amplifier 82 measures the differences between the two waves, and as a result its output at 92 will look like the composite curve shown at graph 92 in FIG. 3. The curve has a first part 96 which passes through zero at point 98, which is at time $t3$. Thereafter, the curve generates a reset line 100 and completes the curve at 102, following the trailing edge of the pulse 52. The reset line 100 is similar in the integral curves 76 and 90, in the preceding graphs of FIG. 3.

The inputs to an electronic switch 104 are through lines 92 and 60. Only if there is an output from the low threshold circuit 56 will the electronic switch 104 pass any signals. Therefore, its output at 106 consists of the wave shown at graph 92, but only between $t2$ and $t4$. This signal is applied to a zero sensor circuit 108 which produces an output on line 110 only when its input is equal to zero. So-called NOR circuits function in a similar manner. Since at time $t2$ there is a difference between the integral voltage 90 and the pulse 52, no output appears at 110 until there is no difference, as at time $t3$ when a small trigger signal 112 is generated. As already noted, time $t3$ is the center of the pulse 52. This small trigger signal 112 energizes a one-shot multivibrator 114, causing it to produce a short rectangular pulse 116 at its output 118. This pulse is short in duration, being of the order of 1 or 2 microseconds. It is nonetheless of sufficient duration to drive pulse classification circuits 134 which follow the apparatus as illustrated.

The pulse 116 is applied to a coincidentally operated, precision electronic switch 120 which receives, through the line 44, the particle pulse 52 at the same time. Accordingly, the switch permits only a narrow slice of the pulse 52 to pass to the output 122. This slice results in a narrow pulse 124 of a duration equal to the duration of the multivibrator output 116 and of an amplitude equal to the amplitude of the pulse 52 at its center, namely the amplitude Amp. A.

Every pulse emerging at output 122 from this circuit will have a duration equal to the duration of the pulse 116. This may be adjusted as desired, but the duration is constant for any sample run. The amplitude of every pulse emerging at 122 will be so close to the amplitude at the center of the raw pulse that for all purposes it may be assumed equal thereto.

Further processing of the detected pulses by the pulse classification circuits can be now accomplished with greater accuracy than if the raw pulses were permitted to pass without using the center finder of this invention.

The output 116 of the multivibrator 114 is used to reset the integrator 74 and the bistable device 66, causing the circuit to return to its stand-by condition until the pulse has subsided and the next pulse crosses the threshold 58 and initiates another cycle of operation. The signal 116 appears on a line 126, its trailing edge is detected in a suitable trailing edge detector 128, and thereafter appears as a pulse 130 in a reset channel 132. This trigger pulse 130 cuts off the integrator 74 along the reset line 100 of the waves shown in FIG. 3.

Now with reference to FIGS. 5 and 6, there is illustrated another form of the invention which produces at the output 122, for use by the pulse classification circuits, a pulse 124' having the required Amp. A, but also possessing a far longer duration. Thus, the pulse classification circuits 134' can be slower acting than those, 134, which processed the pulse 124 shown in FIG. 3 and obtained from the invention in FIG. 2.

The advantages of this second form of the invention is readily obtained from an alteration of some of the coupling lines to affect the timing of portions of the apparatus and also to obviate the use of the pulse 52 as the direct amplitude input to the output switch 120.

In as much as the structure of the two forms of the invention are almost the same, only the differences will be described and changes noted by new and primed reference numbers. The line 44' now originates at the output of the scale factor adjustor 78, such that the pulse producing means 40 is no longer directly connected to the precision electronic switch 120. The reset line 132 is no longer connected to the bistable device 66; however, a second reset line 136 couples a reset pulse 138 from the zero sensor circuit 108 back to the bistable device 66.

The addition of the new reset coupling causes the bistable device to be reset, and thereby stop the further operation of the integrator 74, prior to the resetting of the integrator. Hence, the output 90' from the integrator holds constant at Amp. A throughout the duration of the signal 116' by the multivibrator 114', all of which is shown in FIG. 6.

To accomplish the desired longer output pulse 124', the duration of the pulse 116' from the multivibrator 114' is significantly longer than the previously described pulse 116 shown in FIG. 3. Upon termination of the pulse 116', the integrator is reset by the feedback pulse 130 in the same manner as in the first described form of the invention.

Careful analysis has indicated that particles accelerate as they pass through the aperture. For this reason, the center of a produced pulse would not quite coincide with the occurrence of the particle at the longitudinal center of the aperture path. However, not only is the resultant error of the non-coincidence very slight, but it can be easily compensated for by minor regulation of the scale factor adjustor circuit.

Other methods of achieving the desired result, that is, finding the center, may be devised, but these are believed not as accurate or as economically feasible as that described herein. One of these uses an auxiliary threshold circuit having a threshold level set close to the baseline, whose output is used to trigger a delay one-shot multivibrator. The duration of the output pulse from this one-shot multivibrator would be chosen such that its trailing edge occurred just as the particle was in the center of the aperture. At this time, the trailing edge would trigger another one-shot multivibrator producing a pulse of 1 or 2 microseconds, which would operate a gate or precision electronic switch, permitting the pulse voltage produced by the particle to be applied to a pulse height discriminator for the duration of said latter one-shot multivibrator pulse. This scheme is deficient in that the placement of the low threshold level would make the starting time of the threshold output pulse somewhat indeterminate because of the wide difference in the slopes of different size pulses. This arrangement would have value where a particulate system is used having a narrow dynamic range of sizes.

Another method uses a relative complex circuit to measure backwards in time from the instant a pulse produced by a particle passes its half height the second time while it is being generated by the particle. This is based upon the fact that the particle will probably leave the aperture close to the axis of the aperture, so that its half time from the center of the aperture will be fairly accurate. Such pulses, even if starting with a false peak like 24 or 30 (FIG. 1) on their leading edges, will have practically normal trailing edges. This measurement of time backwards is accomplished by measuring the half-height duration of a pulse, subtracting that part which represents the time elapsed from center-passing to half-height trailing edge, and adding the time of crossing the half height by the leading edge of the pulse, this latter measurement being made as the pulse emerges from a suitable delay line a second time, i.e., after one reflection.

The complexity of such a structure renders it much less desirable than that described herein. This latter is preferred, and it will be appreciated that considerable variation can be made without departing from the spirit of the invention as defined in the appended claims.

What it is desired to secure by Letters Patent of the United States is as follows:

I claim:

1. A particle analyzing system responsive to the size of particles comprising: a transducer having an ambit through which each particle passes to produce a size-amplitude related pulse of random shape, the amplitude of such a related pulse being especially significant at the time when the particle passes through the center of said ambit, pulse center finding apparatus including means responsive to said random shaped pulses for generating a related signal having an amplitude equal to the amplitude occurring only at the center of each said random shaped pulse and regardless of pulse peaks occurring either before or after said center, said center finding apparatus constructed and arranged to operate independent of pulse amplitude peaks, and signal classification circuits coupled to receive each said signal.

2. A particle analyzing system responsive to the passage of particles in suspension, said system having a transducer through which said particles pass to produce electrical pulses which are of random amplitudes, commonly asymmetric about their peaks, but are proportional, at least at their center, to the size of the respective particles producing the same and of a duration equal to the duration of passage of the respective particles through said transducer, said system further having pulse classification circuits for making studies of said particles; and a pulse center finding apparatus for improving the accuracy of said pulse classification circuits in such studies, said center finding apparatus including means interposed between said transucer and pulse classification circuits for locating the center of each pulse independent of the pulse shape, and means responsive to said center locating means for producing a signal whose amplitude is substantially equal to the amplitude occurring only the center of said random amplitude pulses and regardless of pulse peaks occurring either before or after said center, the center finding apparatus being connected to apply all of the signals to the classification circuits independent of said pulses.

3. An improved pulse analyzing apparatus for finding pulse amplitude at the center of a pulse, particularly a pulse which is asymmetric about its peak, comprising: comparing circuitry for receiving said pulse, generating its own integral, and comparing said integral and pulse, said integral passing through the center amplitude of said pulse at the time center of the pulse independent of the location of the pulse peak and particularly when the time center is other than at the peak of the pulse, a switch, elements coupled between said comparing circuitry and said switch for operating said switch for a fixed duration commencing at the time said pulse and integral obtain said center amplitude in said comparing circuitry, a signal having said center amplitude being connected to said switch, and said switch enabled to pass said signal only for the said fixed duration, the output of said switch comprising the output from said center finding apparatus.

4. The apparatus as defined in claim 3 in which said switch operating elements are coupled back to said comparing circuitry to reset said comparing circuitry upon operation of said operating elements.

5. Apparatus as defined in claim 3 in which said signal is said pulse.

6. Apparatus as defined in claim 3 in which said signal is derived from said integral.

7. The apparatus as defined in claim 3 in which each said pulse is derived from an instrument having an electrical path of finite length which is coupled to said comparing circuitry such that the longitudinal center of said path corresponds to the center of said pulse.

8. The apparatus as defined in claim 3 in which there is a low threshold circuit coupled to directly receive each said pulse and to produce a response to each pulse exceeding a given threshold level, and a second switch coupled between said low threshold circuit and said comparing circuitry, said second switch coupling to said comparing circuitry only those pulses which produce a response by said low threshold circuit and inhibiting receipt of all other of said pulses.

9. An improved pulse analyzing apparatus for finding pulse amplitude at the center of a pulse comprising: comparing circuitry for receiving said pulse, generating its own integral, and comparing said integral and pulse, said integral passing through the center amplitude of said pulse at the time center of the pulse, a switch, elements coupled between said comparing circuitry and said switch for operating said switch for a fixed duration commencing at the time said pulse and integral obtain said center amplitude in said comparing circuitry, a signal having said center amplitude being connected to said switch, and said switch enabled to pass said signal only for the said fixed duration, the output of said switch comprising the output from said center finding apparatus, said comparing circuitry including: an integrator, each pulse being adapted to energize the integrator to produce a voltage output signal; scaling means connected to the integrator to adjust the voltage output signal to be equal to the voltage of the pulse energizing the integrator at the time center of the pulse; and an arrangement for detecting the voltage difference between the pulse and voltage output signal and responding to a minimum of difference to provide a gate signal; said gate signal being connected to said operating elements.

10. The apparatus as defined in claim 9 in which said voltage detecting arrangement includes a differential amplifier and said operating elements include a minimum signal sensor which is coupled to receive said gate signal and produces a response when said gate signal has a substantially minimum value.

11. The apparatus as defined in claim 10 in which said operating elements further include a multivibrator coupled between said minimum signal sensor and said switch, said multivibrator producing a switch enabling signal of said fixed duration.

12. The apparatus as defined in claim 11 in which the trailing edge of the switch enabling signal from said multivibrator is coupled back to said integrator for its resetting.

13. The apparatus as defined in claim 11 in which there is a low threshold circuit coupled to directly receive each said pulse and to produce a response to each pulse exceeding a given threshold level, and a second switch coupled between said low threshold circuit and said comparing circuitry, said second switch coupling to said comparing circuitry only those pulses which produce a response by said low threshold circuit and inhibiting receipt of all other of said pulses.

14. The apparatus as defined in claim 13 in which there is a third switch coupled between said differential amplifier and said minimum signal sensor, said third switch being enabled by the response of said low threshold circuit for the duration of such response which is coupled to an input of said third switch.

15. The apparatus as defined in claim 14 in which there is a bistable device interposed between said low threshold circuit and said second switch such that said second switch is closed only by the leading edge of the response from said low threshold circuit.

16. The apparatus as defined in claim 15 in which the switch enabling signal from said multivibrator is coupled back to said integrator and said bistable device for their resetting.

17. The apparatus as defined in claim 16 in which each said pulse is derived from an instrument having an electrical path of finite length which is coupled to said comparing circuitry such that the center of said path corresponds to the center of said pulse.

18. The apparatus as defined in claim 15 in which the response from said minimum signal sensor is coupled back to said bistable device for its resetting.

19. The apparatus as defined in claim 18 in which each said pulse is derived from an instrument having an electrical path of finite length which is coupled to said comparing circuitry such that the time based center of said path corresponds to the center of said pulse, each said pulse is elicited by a liquid suspended particle which passes into the ambit of said instrument for a duration equal to that of said pulse, and in which said instrument forms the input portion of a particle analyzing and sizing system and in which said system further comprises pulse classification structure coupled to the output of said center finding apparatus.

20. A particle analyzing system responsive to the passage of particles in suspension, said system having a transducer through which said particles pass to produce electrical pulses proportional, at least at their center, to the size of the respective particles producing the same and a duration equal to the duration of passage of the respective particles through said transducer, said system further having pulse classification circuits for making studies of said particles; and a pulse center finding apparatus for improving the accuracy of said pulse classification circuits in such studies, said center finding apparatus interposed between said transducer and pulse classification circuits for locating the center of each pulse and, in lieu of each pulse, producing in turn a signal whose amplitude is substantially equal to the amplitude of the pulse in the center thereof and of a fixed duration, the center finding apparatus being connected to apply all of the signals to the classification circuits to the exclusion of said pulses, the center finding apparatus comprising: an integrator coupled to receive pulses from said transducer, a scale factor adjustor coupled to the output of said integrator so that its voltage output is equal to the voltage of the pulse when the particle producing the pulse is in the center of its passage through said transducer, a differential amplifier having the transducer and the integrator connected to the inputs thereof, a minimum signal sensor circuit coupled to the output of the differential amplifier, a multivibrator connected to the sensor circuit and adapted to produce a switching signal of said fixed time duration when the sensor circuit detects a minimum signal, and a switch having said multivibrator and said scale factor adjustor connected thereto, the output of said switch comprising the output of said center finding apparatus.

21. The system as defined in claim 20 in which there is a low threshold circuit connected to the transducer and responsive only to pulses exceeding a given threshold level to produce a response signal, a second switch between the transducer and the integrator, and a control element connecting the response signal to said second signal to permit passage of a pulse from the transducer to the integrator only when said pulse has exceeded said threshold level.

22. The system as defined in claim 21 in which there is a third switch coupled between said differential amplifier and said minimum signal sensor, said third switch being enabled by the response of said low threshold circuit for the duration of such response which is coupled to an input of said third switch, and a reset path from said minimum signal sensor to said control element.

* * * * *